United States Patent
Masuda et al.

(10) Patent No.: US 9,242,754 B2
(45) Date of Patent: Jan. 26, 2016

(54) CONTINUOUS ROTARY FILLING AND PACKAGING MACHINE

(75) Inventors: Tomoyuki Masuda, Tokyo (JP);
Yoshifumi Miki, Itano-gun (JP);
Takanori Yabuuchi, Itano-gun (JP)

(73) Assignees: KABUSHIKI KAISHA YAKULT HONSHA, Minato-ku (JP); SHIKOKU KAKOKI CO., LTD., Itano-gun, Tokushima (JP)

(*) Notice: Subject to any disclaimer, the term of this patent is extended or adjusted under 35 U.S.C. 154(b) by 633 days.

(21) Appl. No.: 13/578,139

(22) PCT Filed: Feb. 10, 2011

(86) PCT No.: PCT/JP2011/000741
§ 371 (c)(1),
(2), (4) Date: Oct. 18, 2012

(87) PCT Pub. No.: WO2011/102099
PCT Pub. Date: Aug. 25, 2011

(65) Prior Publication Data
US 2013/0036708 A1    Feb. 14, 2013

(30) Foreign Application Priority Data
Feb. 16, 2010    (JP) ................. 2010-031028

(51) Int. Cl.
*B65B 7/28* (2006.01)
*B65B 57/00* (2006.01)
(Continued)

(52) U.S. Cl.
CPC ............. *B65B 57/02* (2013.01); *B65B 7/285* (2013.01); *B65B 7/2878* (2013.01); *B65B 51/225* (2013.01)

(58) Field of Classification Search
CPC .......... B65B 7/08; B65B 7/28; B65B 7/2842; B65B 7/285; B65B 7/2857; B65B 7/2878; B65B 57/00; B65B 57/02; B65B 57/04; B67B 3/28; B67B 3/265; B67B 3/268
USPC .............. 53/72, 75, 281, 287, 329, 485, 505, 53/506, 53, 76
See application file for complete search history.

(56) References Cited

U.S. PATENT DOCUMENTS 2,193,440 A * 3/1940 Waldron ................. 53/304
2,506,363 A * 5/1950 Hohl et al. ............... 53/76
(Continued)

FOREIGN PATENT DOCUMENTS

CN    101228076 A    7/2008
CN    100575890 C    12/2009
(Continued)

OTHER PUBLICATIONS

Chinese Office Action dated Dec. 4, 2013, issued in corresponding Chinese Patent Application No. 201180009414.5.
(Continued)

*Primary Examiner* — Andrew M Tecco
*Assistant Examiner* — Praachi M Pathak
(74) *Attorney, Agent, or Firm* — Westerman, Hattori, Daniels & Adrian, LLP (57) ABSTRACT

A continuous rotary filling and packaging machine covers a container body with a molded lid and ultrasonically seals the container body. The molded lid to produce a sealed container includes a lid detecting device 70 disposed on the downstream side of the lid supplying device 60 and an ultrasonic sealing device 100 including lifting and lowering means including a cam mechanism for lifting and lowering a container table 103. The lifting and lowering means is configured such that the molded lid on the container body and a seal working surface of an ultrasonic horn 108 come into press-contact with each other at a top dead point of the container table. A container table lowering control mechanism does not lift, to the top dead point, a container table of a container whose container body does not have the molded lid placed thereon or properly placed thereon as determined.

8 Claims, 4 Drawing Sheets

(51) Int. Cl.
  *B65B 57/02* (2006.01)
  *B65B 57/04* (2006.01)
  *B67B 3/26* (2006.01)
  *B65B 51/22* (2006.01)

(56) References Cited

U.S. PATENT DOCUMENTS

| | | | | |
|---|---|---|---|---|
| 2,972,216 | A | * | 2/1961 | Schmidt .......................... 53/281 |
| 3,492,785 | A | * | 2/1970 | Mancini .......................... 53/282 |
| 3,572,007 | A | * | 3/1971 | Shelby et al. ................... 53/282 |
| 4,312,172 | A | * | 1/1982 | Fisher et al. .................... 53/489 |
| 4,498,275 | A | * | 2/1985 | Baron .............................. 53/506 |
| 4,773,204 | A | * | 9/1988 | Rydstrom ....................... 53/506 |
| 4,866,907 | A | * | 9/1989 | Iuchi et al. ...................... 53/299 |
| 4,870,806 | A | * | 10/1989 | Sprenger ........................ 53/485 |
| 4,872,300 | A | * | 10/1989 | Luke ................................ 53/53 |
| 5,651,235 | A | * | 7/1997 | Ashley et al. .................. 53/458 |
| 6,209,591 | B1 | * | 4/2001 | Taggart ............................ 141/89 |
| 6,481,468 | B1 | * | 11/2002 | Taggart ............................ 141/85 |
| 2003/0009984 | A1 | * | 1/2003 | Baskin .............................. 53/75 |

FOREIGN PATENT DOCUMENTS

| | | |
|---|---|---|
| EP | 1759996 A1 | 3/2007 |
| EP | 1 918 219 A1 | 5/2008 |
| GB | 2 160 185 A | 12/1985 |
| JP | 09-505019 A | 5/1997 |
| JP | 2000-109189 A | 4/2000 |
| JP | 2005-343507 A | 12/2005 |
| JP | 2005-343508 A | 12/2005 |
| JP | 4258873 B2 | 4/2009 |
| WO | 95/25039 A1 | 9/1995 |
| WO | 02/072426 A1 | 9/2002 |
| WO | 2006/098231 A1 | 9/2006 |

OTHER PUBLICATIONS

Extended European Search Report of Application No. 11744393.7, dated Oct. 8, 2013. (6 pages).

International Search Report of PCT/JP2011/000741, mailing date of May 17, 2011.

* cited by examiner

(a) PLAN VIEW     (b) FRONT VIEW

CONTINUOUS ROTARY FILLING AND PACKAGING MACHINE

TECHNICAL FIELD

The present invention relates to a continuous rotary filling and packaging machine that fills a container body with liquid contents, covers the container body filled with the liquid contents with a molded lid using a lid supplying device, and heat-seals the container body and the lid to produce a sealed container and, more particularly, to a continuous rotary filling and packaging machine including a mechanism for preventing liquid in a container whose container body does not have the molded lid placed thereon or properly placed thereon as determined by a lid detecting device disposed on a downstream side of the lid supplying device from being in contact with a working surface of a sealing device and conveying the container to the next process.

BACKGROUND ART

As a conventional filling and sealing device that fills a container body with liquid contents, covers the container body filled with the liquid contents with a molded lid made of synthetic resin using a lid supplying device, and ultrasonically seals the container body and the lid to produce a sealed container, there is proposed a filling and packaging machine that fills a container body with contents, covers the container body, which is filled with the contents, with a lid, and seals the container body and the lid to produce a sealed container, the filling and packaging machine including a container supplying device that supplies a bottomed cylindrical container body made of synthetic resin to a filling device, the filling device that fills the supplied container body with contents, a primary lid cold molding device that molds, from a sheet-like lid material, a molded lid made of synthetic resin including a disc-like lid body and a skirt provided to be suspended from the circumferential edge of the lid body, a lid supplying device that supplies the molded lid to an upper opening of the container body filled with the contents, a sealing device that seals an upper end opening of the container body with the molded lid to produce a sealed container, and a secondary lid molding device that molds the lid of the sealed container molded by the primary lid cold molding device into a final lid shape (see for example, Patent Documents 1 and 2).

Besides, concerning an ultrasonic filling and sealing device, there is known a container ultrasonic sealing method for sealing a container body with a container forming component using an ultrasonic horn including a seal working surface, the method including pressurizing, in a state in which sealed portions of the container body and the container forming component are superimposed each other, the sealed portions with the seal working surface and causing ultrasonic rotational vibration in a rotating direction, which has the center in an axis parallel to a pressuring direction, to act on the seal working surface (see for example, Patent Document 3). Further, there is known a packaging container including a container body made of synthetic resin having a flange section at an upper end opening circumferential edge used for ultrasonic sealing, a top plate section, and a skirt provided to be suspended from the circumferential edge of the top plate section, wherein the top plate section includes a container lid heated to seal the upper surface of the flange section of the container body, and the flange section includes a first cutout section at the outer edge upper end thereof (see for example, Patent Document 4).

PRIOR ART DOCUMENTS

Patent Documents

Patent Document 1: Japanese Unexamined Patent Application Publication No. 2005-343508
Patent Document 2: Japanese Unexamined Patent Application Publication No. 2005-343507
Patent Document 3: WO2002/072426
Patent Document 4: WO2006/098231

SUMMARY OF THE INVENTION

Object to be Solved by the Invention

It is an object of the present invention to provide a continuous rotary filling and packaging machine that fills a container body with liquid contents, covers the container body filled with the liquid contents with a molded lid using a lid supplying device, and heat-seals the container body and the lid to produce a sealed container. The continuous rotary filling and packaging machine includes a sealing device that substantially reduces occurrence of a sealing failure that is caused because the molded lid is not placed on the container body or not properly placed on the container body.

Means to Solve the Object

The present inventors developed a continuous rotary filling and packaging machine having high production ability for enabling filling of 33,000 bottles per hour that fills a container body with liquid contents, covers the container body, which is filled with 125 ml of the liquid contents, with a molded lid using a lid supplying device and ultrasonically seals the container body and the lid to produce a sealed container. However, a product having a sealing failure was found at a ratio of one in several ten thousand to several hundred thousand bottles. The present inventors found that, when the molded lid was not placed on the container body, if the container body was sealed by a sealing device, liquid as the filled contents sometimes adhered to a seal working surface, and one of causes of such a sealing failure was a deposit formed from the liquid dried by the heat of the sealing device when the liquid adhered to the seal working surface. Further, the present inventors found that, since the deposit remained without being completely removed unless being cleaned, the deposit was unsanitary and likely to be mixed in the liquid contents as foreign matters. The inventors found that, when the sealing device was an ultrasonic sealing device, in particular, the sealing device including a molded lid and an ultrasonic horn that caused ultrasonic rotational vibration in a rotating direction, which has the center of an axis in a pressurizing direction for pressurizing the container body, to act, since liquid was present between a working surface of the ultrasonic horn, which was a rotating vibrator, and the front surface of the molded lid, a slip occurred between the working surface of the horn and the front surface of the molded lid, rotational vibration was not sufficiently transmitted to the molded lid, heat generation between the rear surface of the molded lid and the container body was attenuated, and a sealing failure was caused. The present inventors also found that, when a molded lid made of synthetic resin including a disc-like lid body and a skirt provided to be suspended from the circumferential edge of the lid body was not properly placed on a container body, a sealing failure right under the circumferential edge of the lid body was caused according to a shift of the placement. Therefore, the present inventors found that the sealing failure was substantially reduced by disposing a lid detecting device on a downstream side of the lid supplying device, providing a container table lowering control mechanism that does not lift a container on a container table, the container body of which does not have the molded lid placed thereon or properly placed thereon as determined, and does not bring into press-contact with the seal working surface, preventing contact with the seal working surface, and conveying the container to the next process and the present inventors ended in completing the present invention.

The present invention relates to (1) a continuous rotary filling and packaging machine that fills a container body with liquid contents, covers the container body filled with the liquid contents with a lid, and seals the container body and the lid to produce a sealed container, the filling and packaging machine including: a filling device that fills the container with the liquid contents while the container body rotationally moves; a lid supplying device that supplies a molded lid to an upper end opening of the container body that is filled with the liquid contents and transferred from the filling device; a lid detecting device disposed on a downstream side of the lid supplying device; and a sealing device including a seal working surface for heat-sealing the molded lid to the upper end opening of the container body to produce the sealed container while the container body on which the molded lid is placed rotationally moves, a lifting and lowering means including a cam mechanism for lifting and lowering a container table on which the container body is placed, the lifting and lowering means being configured such that the molded lid on the container body and the seal working surface come into press-contact with each other at a top dead point of the container table, and a container table lowering control mechanism that does not lift a container table of a container whose container body does not have the molded lid placed thereon or properly placed thereon as determined by the lid detecting device, to the top dead end; (2) the continuous rotary filling and packaging machine according to (1), wherein the lid detecting device includes a pair of photoelectric sensors for detecting a conveyed container and a laser sensor for detecting the container whose container body does not have the molded lid placed thereon or properly placed thereon, and (3) the continuous rotary filling and packaging machine according to (1) or (2), wherein the lifting and lowering means of the sealing device includes a spring for pushing up the container table, and the molded lid on the container body and the seal working surface are brought into press-contact with each other by the urging force of the spring during the sealing.

The present invention relates to (4) the continuous rotary filling and packaging machine according to (3), wherein the lifting and lowering means of the sealing device includes a placing table fixed to a lower supporting plate and a container table attached above the placing table to be capable of rising and falling, the placing table includes a fixed plate fixed to the lower supporting plate, a guiding cylinder provided at an upper side of the fixed plate, and a cylindrical bracket provided to be suspended from the fixed plate, wherein the container table includes a container placing plate on which the container is placed, a container holder that is provided on the upper surface of the container placing table and positions the container on the container placing plate, and a cylindrical skirt provided to be suspended from the container placing plate, and wherein a rising and falling body that can slide to be capable of rising and falling in the guiding cylinder is provided in the guiding cylinder, the cylindrical skirt of the container table is provided on the outer surface of the guiding cylinder of the placing table to be capable of sliding, a spring that supports the container table from the lower side is provided between the upper end of the rising and falling body and the lower surface of the container placing table, a long hole is provided in the guiding cylinder of the placing table, a shaft is attached to a position of the rising and falling body corresponding to the long hole, a cam follower is provided at the distal end of the shaft, the cam follower is guided by a cam provided outward the lower supporting plate of the sealing device, and the rising and falling body in the guiding cylinder rises and falls according to the operation of the cam follower, (5) the continuous rotary filling and packaging machine according to any one of (1) to (4), wherein the container table lowering control mechanism of the sealing device includes a fluid pressure cylinder for controlling the container table to be lowered against lifting of the container table by the urging force of the spring, (6) the continuous rotary filling and packaging machine according to (5), wherein the container table lowering control mechanism of the sealing device is attached to be suspended from the center of the lower surface of the container placing plate and includes a member to be regulated having a T-shape in cross section provided at the lower end of a lifting and lowering regulating rod extending to pierce through the center of the rising and falling body to be capable of sliding against the rising and falling body, a fluid pressure cylinder attached to the cylindrical bracket of the placing table such that a cylinder rod faces up, and a substantially C-shaped regulating member provided at a distal end of the cylinder rod, and the container table lowering control mechanism performs control to retain a state in which the cylinder rod retracts, whereby rising of the container table is regulated by the regulating member via the member to be regulated, (7) the continuous rotary filling and packaging machine according to (5) or (6), wherein the fluid pressure cylinder is an air cylinder, (8) the continuous rotary filling and packaging machine according to any one of (1) to (7), wherein the sealing device is a sealing device including an ultrasonic horn that causes to act an ultrasonic rotational vibration in a rotating direction, of which has a central axis is in a pressurizing direction for pressurizing the molded lid and the container body, to act, and (9) the continuous rotary filling and packaging machine according to any one of (1) to (8), wherein the molded lid is a molded lid made of synthetic resin including a disc-like lid body and a skirt provided to be suspended from the circumferential edge of the lid body.

Effect of the Invention

With the continuous rotary filling and packaging machine according to the present invention, the lid detecting device is disposed on the downstream side of the lid supplying device to prevent a container whose container body does not have the molded lid placed thereon or properly placed thereon as determined by the lid detecting device is prevented from being in contact with the seal working surface, and the container is controlled to be conveyed to the next process. Consequently, it is possible to substantially reduce a sealing failure.

BRIEF DESCRIPTION OF DRAWINGS

FIG. 2 is a plan view (a) and a front view (b) of a lid detecting device of the continuous rotary filling and packaging machine according to the present invention.

MODE OF CARRYING OUT THE INVENTION

A continuous rotary filling and packaging machine according to the present invention is not specifically limited as long as the continuous rotary filling and packaging machine is a filling and packaging machine that fills a container body with liquid contents, covers the container body filled with the liquid contents with a lid, and heat-seals the container body and the lid to produce a sealed container, the filling and packaging machine including: a filling device that fills the container with the liquid contents while the container body rotationally moves; a lid supplying device that supplies a molded lid to an upper end opening of the container body that is filled with the liquid contents and transferred from the filling device; a lid detecting device disposed on a downstream side of the lid supplying device; and a sealing device including a seal working surface for heating the molded lid and sealing the upper end opening of the container body with the molded lid to produce the sealed container, a lifting and lowering means including a cam mechanism for lifting and lowering a container table on which the container body is placed, the lifting and lowering means being configured such that the molded lid on the container body and the seal working surface come into press-contact with each other at a top dead point of the container table, and a container table lowering control mechanism that does not lift, to the top dead point, a container table of a container whose container body does not have the molded lid placed thereon or properly placed thereon as determined by the lid detecting device. As the container body, a bottomed cylindrical container body made of synthetic resin such as a bottle-like container body made of synthetic resin can be suitably illustrated. As the lid, a molded lid including a disc-like lid body and a skirt provided to be suspended from the circumferential edge of the lid body, for example, a molded lid made of synthetic resin or a molded lid including a metal foil layer can be suitably illustrated. When the lid is the molded lid made of synthetic resin including the disc-like lid body and the skirt provided to be suspended from the circumferential edge of the lid body, it is desirable that the continuous rotary filling and packaging machine includes a primary lid cold molding device that molds, from a sheet-like lid material, the molded lid made of synthetic resin including the disc-like lid body and the skirt provided to be suspended from the circumferential edge of the lid body and a secondary lid molding device that molds the molded lid of the sealed container molded by the primary lid cold molding device into a final lid shape.

The continuous rotary filling and packaging machine according to the present invention may include a container supplying device. The container supplying device is not specifically limited as long as the container supplying device is a device that can supply a container body to the filling device. A well-known container supplying device including, for example, a container vertically adjusting device, a conveyor, a screw conveyor, and an inlet stir wheel that supplies the container body to the filling device can be used. When such a container supplying device is used, bottle-like containers made of synthetic resin, which are supplied in arbitrary orientations, can be vertically adjusted by the container vertically adjusting device such that upper end openings thereof face up and placed on the conveyor in a row. The containers placed on the conveyor are conveyed to the downstream side and aligned at a predetermined pitch by the screw conveyor in a downstream section of the conveyor. The aligned containers are supplied to the filling device via the inlet stir wheel.

The filling device is not specifically limited as long as the filling device is a device that can fill the container with liquid contents while the container body supplied by the container supplying device rotationally moves. For example, a well-known filling device including a filling liquid tank, a predetermined number of filling nozzles provided to face down at equal intervals on the lower surface of the circumferential edge of the filling liquid tank, a container placing table provided in a position corresponding to the filling nozzles below the filling nozzles, and a rotating table to which the container placing table is attached can be used. Above all, for high-speed filling at 33,000 bottles/hour, a vacuum filling device that sets the container in a closed state and fills the container with liquid contents while sucking and removing air is desirable. When such a filling device is used, the container placing table or the filling nozzles rise or fall and the container can be filled with the contents while the container on the container placing table is rotating.

The lid supplying device is not specifically limited as long as the lid supplying device is a device that can supply a molded lid, desirably, a molded lid made of synthetic resin including a disc-like lid body and a skirt provided to be suspended from the circumferential edge of the lid body to an upper end opening of the container body that is filled with the liquid contents and transferred from the filling device. Lids molded by a lid molding means are dropped to a lid feeding device (a shoot) in a lower part. Upper openings of containers conveyed by an intermediate stir wheel or the like are covered with the lids one by one. Besides the primary lid cold molding device including a lid punching molding device and the sheet-like lid material for cold molding, the container body and the secondary lid molding device are described in detail in Patent Document 1.

As the lid detecting device, a lid detecting device that is disposed on the downstream side of the lid supplying device in the intermediate stir wheel and can detect a container in which a molded lid is not placed on a container body or not properly placed on the container body is desirable. For example, a lid detecting device including a pair of photoelectric sensors for detecting a conveyed container and a laser sensor for detecting a container in which a molded lid is not placed on a container body or not properly placed on the container body or a CCD camera for detecting a container in which a molded lid is not placed on a container body or not properly placed on the container body can be illustrated. If such a lid detecting device is used, when the photoelectric sensor detects a conveyed container, the laser sensor emits a laser beam to a container opening. By detecting a reflected light amount of the laser beam with a sensor and measuring time from the emission of the laser beam until the detection of the reflected light and a light amount, it is possible to check, with a determination program, whether a molded lid is placed on a container body or properly placed on the container body or check, from an image pickup result of the CCD camera, with the determination program, whether a molded lid is placed on a container body or properly placed on the container body.

As the sealing device, besides an ultrasonic heat sealing device and a high-frequency heat sealing device, a heat sealing device that presses a heating member against a member to be sealed and causes the heat of the heating member to directly act on the member to be sealed can be illustrated.

However, it is desirable to use the ultrasonic heat sealing device that can enjoy the effects by the present invention most. As such an ultrasonic heat sealing device, a device that can seal an upper end opening of a container body with a molded lid to produce a sealed container can be suitably illustrated. The device includes an ultrasonic horn (see Patent Document 3) that, for example, while a container body on which a molded lid is placed supplied via an intermediate stir wheel rotationally moves, ultrasonically seals an upper end opening of the container body with the molded lid to produce a sealed container and causes to act an ultrasonic rotational vibration in a rotating direction, of which a central axis is in a pressurizing direction for pressurizing the molded lid and the container body, to act, lifting and lowering means including a cam mechanism for lifting and lowering a container table on which the container body is placed, the lifting and lowering means being configured such that the molded lid on the container body and the working surface of the ultrasonic horn come into press-contact with each other at a top dead point of the container table, and a container table lowering control mechanism that does not lift, to the top dead point, a container table of a container whose container body does not have the molded lid placed thereon or properly placed thereon as determined by the lid detecting device. On a working surface of the ultrasonic horn, it is desirable to provide radial grooves in order to increase a frictional force between the working surface and the surface of the molded lid. An ultrasonic welding machine including the ultrasonic horn can perform welding by giving ultrasonic rotational vibration having a frequency of 15 to 50 kHz, desirably, 20 to 30 kHz, and amplitude of 16 to 126 μm, desirably, 70 to 80 μm to a bonding surface. For example, when an opening of a polystyrene resin container is sealed with a cold-molded lid to produce a sealed container, it is desirable to perform welding at a frequency of 20 to 30 kHz, power of 50 to 500 w/piece, a sealing time of 0.2 to 1 second, and the like while pressurizing the molded lid and the container body at 100 to 120 N. A lid of a resin container such as a beverage container welded under such conditions can be peeled by a finger with a force of 8 to 12 N. Peeling strength for preventing the lid from peeling even if the sealed container is carelessly dropped is obtained. As the high-frequency heat sealing device, a high-frequency sealing device including a ring-like induction heating coil that heats a portion corresponding to a container mouth edge of the molded lid, a ring-like heat resistant elastic body that presses the lid against the container mouth edge, and a magnetic body that concentrates magnetic fluxes and increases a heating effect can be illustrated.

As the lifting and lowering means in the sealing device, lifting and lowering means including a spring for pushing up the container table and means for bringing the molded lid on the container body and the seal working surface into contact with each other with the urging force of the spring during sealing is desirable. More specifically, lifting and lowering means including a placing table fixed to a lower supporting plate and a container table attached above the placing table to be capable of rising and falling can be illustrated. The placing table includes a fixed plate fixed to the lower supporting plate, a guiding cylinder provided above the fixed plate, and a cylindrical bracket provided to be suspended from the fixed plate. The container table includes a container placing plate on which the container is placed, a container holder that is provided on the upper surface of the container placing table and positions the container on the container placing plate, and a cylindrical skirt provided to be suspended from the container placing plate. In the guiding cylinder, a rising and falling body that can slide to be capable of rising and falling in the guiding cylinder is provided. The cylindrical skirt of the container table is provided on the outer surface of the guiding cylinder of the placing table to be capable of sliding. A spring that supports the container table from the lower side is provided between the upper end of the rising and falling body and the lower surface of the container placing table. A long hole is provided in the guiding cylinder of the placing table. A shaft is attached to a position of the rising and falling body corresponding to the long hole. A cam follower is provided at the distal end of the shaft. The cam follower is guided by a cam provided outward the lower supporting plate of the sealing device. The rising and falling body in the guiding cylinder rises and falls according to the operation of the cam follower.

As the lowering control mechanism for the container table of the sealing device, a mechanism including a fluid pressure cylinder for controlling the container table to be lowered against lifting of the container table by the urging force of the spring is desirable. More specifically, a mechanism can be illustrated that is attached to be suspended from the center of the lower surface of the container placing plate, includes a member to be regulated reverse T-shaped in cross section provided at the lower end of a lifting and lowering regulating rod extending to pierce through the center of the rising and falling body to be capable of sliding against the rising and falling body, a fluid pressure cylinder attached to the cylindrical bracket of the placing table such that a cylinder rod faces up, and a substantially C-shaped regulating member provided at the distal end of the cylinder rod, and performs control to retain a state in which the cylinder rod retracts, whereby rising of the container table is regulated by the regulating member via the member to be regulated. As the fluid pressure cylinder, an air cylinder can be suitably illustrated.

A continuous rotary filling and packaging machine, which is a first embodiment of the continuous rotary filling and packaging machine according to the present invention, is explained more specifically below with reference to the drawings. The continuous rotary filling and packaging machine is a filling and packaging machine that fills a container body with liquid contents, covers the container body filled with the liquid contents with a lid, and ultrasonically seals the container body and the lid to produce a sealed container. The filling and packaging machine includes a container supplying device including an inlet stir wheel that supplies a bottomed cylindrical container body made of synthetic resin to a filling device, the filling device that fills the container with the liquid contents while the container body supplied via the inlet stir wheel rotationally moves, a lid supplying device that includes an intermediate stir wheel and supplies a molded lid made of synthetic resin including a disc-like lid body and a skirt provided to be suspended from the circumferential edge of the lid body to an upper end opening of the container body that is filled with the liquid contents and transferred from the filling device to the intermediate stir wheel, a lid detecting device disposed on a downstream side of the lid supplying device in the intermediate stir wheel, and an ultrasonic sealing device including an ultrasonic horn that ultrasonically seals, while the container body on which the molded lid is placed supplied via the intermediate stir wheel rotationally moves, an upper end opening of the container body with the molded lid to produce a sealed container and causes ultrasonic rotational vibration in a rotating direction, which has the center set in an axis parallel to a pressurizing direction for pressurizing the molded lid and the container body, to act, lifting and lowering means including a cam mechanism for lifting and lowering a container table on which the container body is placed, the lifting and lowering means being configured such that the molded lid on the container body and a working surface of the ultrasonic horn come into press-contact with each other at a top dead point of the container table, and a container table lowering control mechanism that does not lift, to the top dead point, a container table of a container whose container body does not have the molded lid placed thereon or properly placed thereon as determined by the lid detecting device. However, the technical scope of the present invention is not limited by these illustrations.

Figure 1:
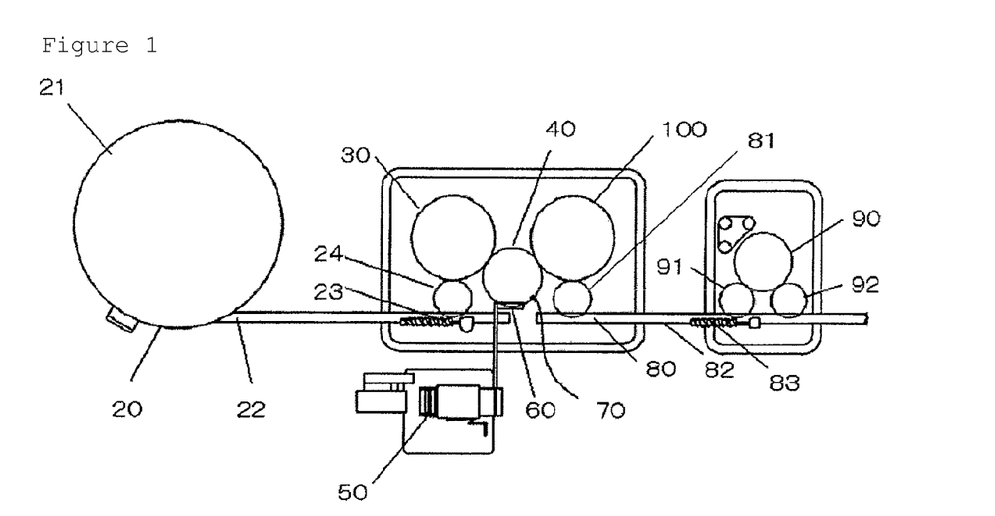
FIG. 1 is a plan view showing an entire embodiment of a continuous rotary filling and packaging machine according to the present invention.

In FIG. 1, an embodiment of a continuous rotary filling and packaging machine for high-speed filling at 33,000 bottles/hour according to the present invention is shown as an overall plan view. As shown in FIG. 1, the continuous rotary filling and packaging machine according to the present invention schematically includes a container supplying device 20 that supplies a bottomed cylindrical container main body made of synthetic resin to a filling device, a filling device 30 that fills the supplied container body with contents, a primary lid cold molding device 50 that molds, from a sheet-like lid material, a molded lid made of synthetic resin including a disc-like lid body and a skirt provided to be suspended from the circumferential edge of the lid body, a lid supplying device 60 that supplies a molded lid P to an upper end opening of the container body filled with the contents, a lid detecting device 70 disposed on a downstream side of the lid supplying device, a sealing device 100 that seals the upper end opening of a container body B with the molded lid P to produce a sealed container, a container carrying-out device 80 that carries out the sealed container, and a secondary lid molding device 90 that molds the molded lid P of the sealed container molded by the primary lid cold molding device 50 into a final lid shape.

The container supplying device 20 includes a container vertically adjusting device 21, a conveyor 22, and a screw conveyor 23. The container vertically adjusting device 21 vertically adjusts bottle-like bottomed cylindrical container bodies B made of synthetic resin, which are supplied in arbitrary orientations, such that upper end openings thereof face up and places the bottomed cylindrical container bodies B on the conveyor 22 in a row. The container bodies B placed on the conveyor are conveyed to a downstream side and aligned at a predetermined pitch by the screw conveyor 23 in a conveyor downstream section. The aligned container bodies B are supplied to the filling device 30 via an inlet stir wheel 24. In the filling device 30, liquid contents are filled in a container from forty vacuum filling nozzles (not shown in the figure) while the container rotationally moves in the device. The container filled with the liquid contents is transferred to an intermediate stir wheel 40.

The primary lid cold molding device 50 is provided near the filling device 30 of the continuous rotary filling and packaging machine. The primary lid cold molding device 50 punches a sheet-like lid material made of synthetic resin in a substantially disc shape and molds the punched lid material into a molded lid P consisting of a lid body having a substantially C shape in cross section, i.e., a disc shape and a skirt provided to be suspended from the circumferential edge of the lid body. The molded lid P is laid over the upper end opening of the container body B, which is conveyed by the intermediate stir wheel 40, by the lid supplying device 60. The lid detecting device 70 disposed on the downstream side of the lid supplying device 60 in the intermediate stir wheel 40 detects a container in which the molded lid P is not placed on the container body B or not properly placed on the container body B.

Subsequently, the container filled with the contents is supplied from the intermediate stir wheel 40 to the ultrasonic sealing device 100. In the ultrasonic sealing device 100, a container which it is determined by the lid detecting device 70 that the molded lid is properly placed is ultrasonically sealed and hermetically sealed with the molded lid P while the container moves in the sealing device. The sealed container is conveyed to the container carrying-out device 80. A container on which the molded lid P is determined by the lid detecting device 70 as being not placed or not being properly placed is conveyed to the container carrying-out device 80 in a state in which contact of the molded lid P and a horn 108 is controlled to be prevented.

The container carrying-out device 80 includes a carry-out stir wheel 81, a carry-out conveyor 82, and a screw conveyor 83. Sealed containers are placed on the carry-out conveyor 82 via the carry-out stir wheel 81. The sealed containers placed on the carry-out conveyor 82 are conveyed to the downstream side and aligned at a predetermined pitch by the screw conveyor 83 in a carry-out conveyor downstream section. The aligned sealed containers are supplied to the secondary lid molding device 90 via an inlet stir wheel 91. The secondary lid molding device 90 secondarily molds the molded lid P sealing the container body into a sealed container having a final shape while the sealed container moves in the device. The sealed container having the final shape is conveyed to the next process via an outlet stir wheel 92. The container on which the molded lid is determined by the lid detecting device 70 as not being placed or not being properly placed is discharged by a container discharging means (not shown in the figure) immediately after being placed on the carry-out conveyor 82. The container discharging means is configured to blow away, with an air blow, the container without a lid on the carry-out conveyor 82 to a slide-like shoot beside the conveyor and discharge the container to the outside of the machine with the shoot.

Figure 2:
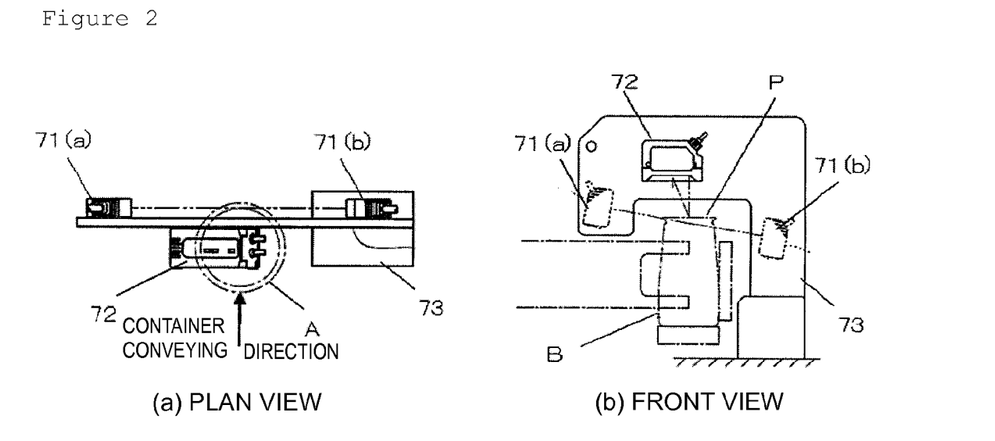

In FIG. 2, (a) a plan view and (b) a front view of the lid detecting device 70 are shown. As shown in FIG. 2(b), a pair of photoelectric sensors 71 are fixedly provided in a bracket 73 on a plane orthogonal to the container conveying direction and such that a conveyed container blocks a line segment that connects sensor transmitting and receiving units of the pair of photoelectric sensors 71. When a container is conveyed to the lid detecting device 70 provided in the intermediate stir wheel 40, the container blocks light between the pair of photoelectric sensors. The photoelectric sensors detect, according to a change in a light amount, that the container is conveyed to the lid detecting device 70. When the photoelectric sensors detect the conveyed container, a laser sensor 72 also fixedly provided in the bracket emits a laser beam to a container opening end. A reflected light amount after the laser beam emission is detected by a sensor. Time from the emission of the laser beam until the detection of the reflected light and a light amount are measured to detect whether a molded lid is laid over the container or properly placed on the container.

Figure 3:
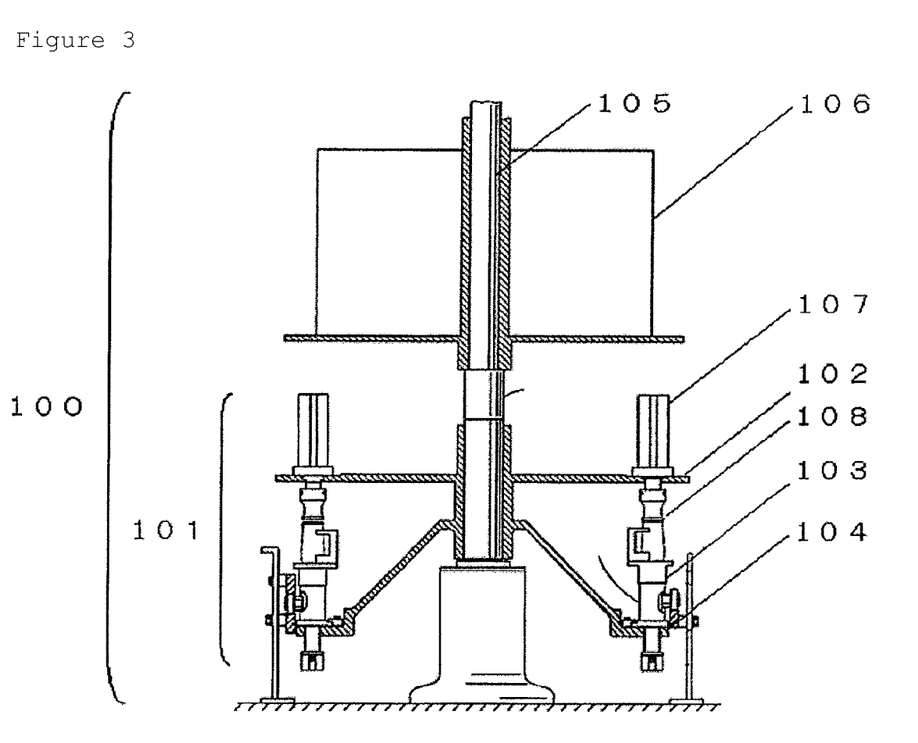
FIG. 3 is a longitudinal sectional view of an ultrasonic sealing device in the continuous rotary filling and packaging machine according to the present invention.

An overall diagram (a longitudinal sectional view) of the ultrasonic sealing device 100 is shown in FIG. 3. The ultrasonic sealing device 100 includes an upper supporting plate 102, in the circumferential edge of which thirty ultrasonic welding machines 101 are fixedly provided at equal intervals, and a lower supporting plate 104, on which thirty container tables 103 are fixedly provided in opposed positions below the ultrasonic welding machines. The upper supporting plate 102 and the lower supporting plate 104 are fixed to a driving shaft 105 of the sealing device. A control device 106 of the sealing device is provided above the respective ultrasonic welding machines. The ultrasonic welding machine 101 consists of a welding machine body 107 fixedly provided in the upper supporting plate 102 and a round bar-like horn 108 projecting downward from the welding machine body 107 and having a seal working surface at the lower end. A not-shown vibrator that causes ultrasonic rotational vibration to act is incorporated in the ultrasonic welding machine. Rotational vibration is transmitted to the seal working surface of the horn by such a vibrator. The container table 103 that carries a container and presses the upper end of the container against the horn 108 via a lid laid over the container is attached to the lower supporting plate 104 via a placing table 111.

Figure 4:
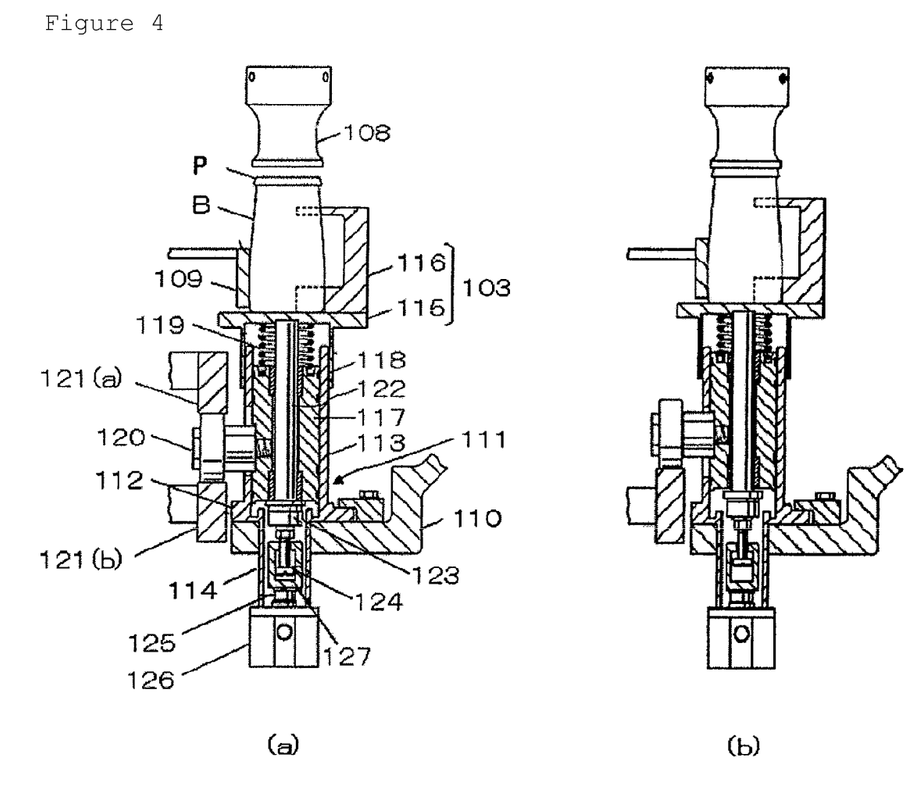
FIG. 4 is a partially enlarged view of the ultrasonic sealing device in the continuous rotary filling and packaging machine according to the present invention.

A partially enlarged view of the ultrasonic sealing device 101 in which a lid is laid over a container body is shown in FIG. 4. FIG. 4(a) shows a partially enlarged view at a point when the container body is supplied from the intermediate stir wheel 40 to the ultrasonic sealing device 100. FIG. 4(b) shows a partially enlarged view during sealing. The sealing device 100 includes the placing table 111 fixed to a lower supporting plate 110 and includes, above the placing table, the container table 103 that is capable of rising and falling. The placing table 111 includes a fixed plate 112 fixed to the lower supporting plate 104, a guiding cylinder 113 provided above the fixed plate, and a cylindrical bracket 114 provided to be suspended from the fixed plate. The container table 103 includes a container placing plate 115 on which a container is placed, a container holder 116 that is provided on the upper surface of the container placing table and positions the container on the container placing plate, and a cylindrical skirt 118 provided to be suspended from the container placing plate. Further, a guide member 109 that guides the outer side of a conveying path for conveyance of the container by the container table is provided outward the container holder.

A rising and falling body 117 that can slide to be capable of rising and falling in the guiding cylinder is provided in the guiding cylinder 113. The skirt 118 of the container table 103 is provided on the outer surface of the guiding cylinder of the placing table to be capable of sliding. A spring 119 is provided between the upper end of the rising and falling body 117 and the lower surface of the container placing plate 115. The container table 103 is supported from the lower side by the spring.

A long hole is provided in the guiding cylinder 113 of the placing table 111. A shaft is attached in a position corresponding to the long hole of the rising and falling body 117. A cam follower 120 is provided at the distal end of the shaft. A cam 121 is provided outward the lower supporting plate of the sealing device. In a supply position (see FIG. 4(a)) where a container is supplied to the sealing device 100, the cam follower 120 is guided by a pair of upper cam 121(a) and lower cam 121(b). A container body filled with liquid is smoothly led into the sealing device according to the operation of the cam follower that rolls on the lower cam. In a sealing position where the upper cam 121(a) is not provided and to which the lower cam 121(b) rises, the rising and falling body 117 in the guiding cylinder performs a rising and falling operation according to the guiding of the cam follower 120 that rolls on the lower cam.

A lifting and lowering regulating rod 122 is attached to be suspended from the center of the lower surface of the container placing plate. The lifting and lowering regulating rod 122 extends to pierce through the center of the rising and falling body 117 to be capable of sliding against the rising and falling body 117. A stopper 123 is provided in a lower part of the lifting and lowering regulating rod 122 to regulate the lifting and lowering regulating rod 122 not to project further upward than the rising and falling body 117 to come off. A member to be regulated 124 reverse T-shaped in cross section is provided at the lower end of the lifting and lowering regulating rod 122.

An air cylinder 126 is attached to the cylindrical bracket 114 of the placing table such that a cylinder rod 125 faces up. A substantially C-shaped regulating member 127 is provided at the distal end of the cylinder rod.

In FIG. 4, the operation of the sealing device performed when a container is supplied to the sealing position 100 in a state in which a molded lid is properly placed on a container body is shown. In this case, as shown in FIG. 4, the cylinder rod 125 of the air cylinder 126 retains an extended state through a sealing operation of the sealing device. When the rising and falling body 117 is caused to rise in the guiding cylinder via the cam follower 120 by the lower cam 121(b), the container table also rises via the spring. The container on the container table is pressed by the seal working surface at the lower end of the ultrasonic horn of the ultrasonic welding machine. The molded lid also pivotally repeatedly vibrates according to pivotal repeated vibration of the seal working surface in the pressed state. The container body B and the molded lid P are sealed by frictional heat generated between molded lid and the fixed container body. At this point, the cylinder rod 125 of the air cylinder retains the extended state through the sealing operation of the sealing device. Therefore, rising of the container table 103 is not regulated by the regulating member 127.

Figure 5:
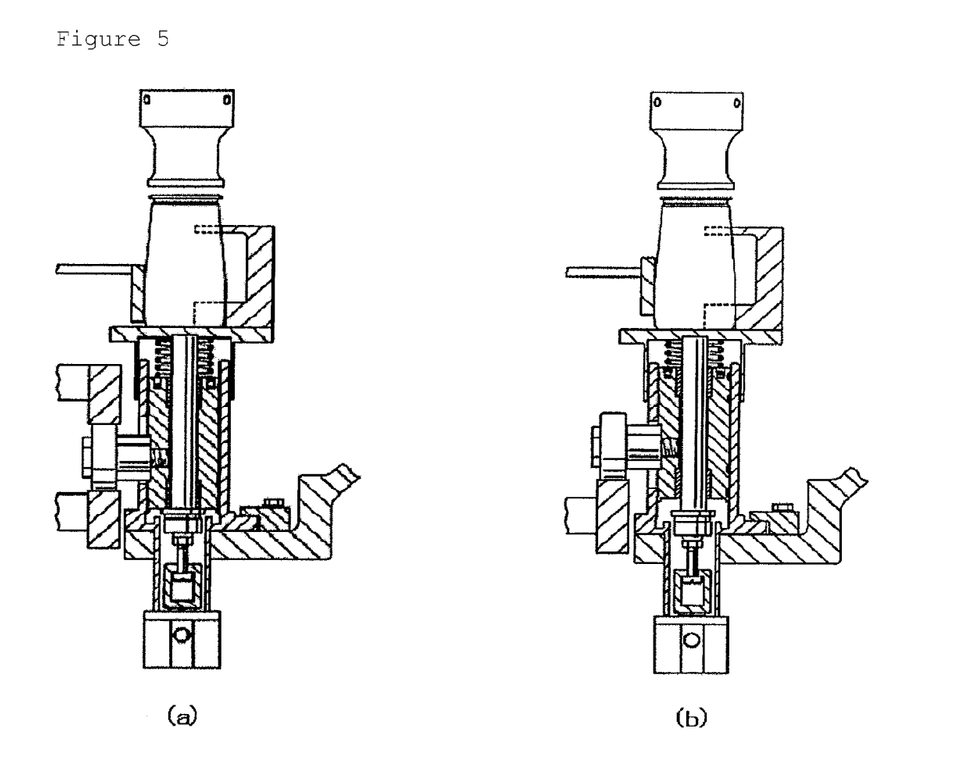
FIG. 5 is a partially enlarged view of the ultrasonic sealing device in the continuous rotary filling and packaging machine according to the present invention.

FIG. 5 shows the operation of the sealing device 100 performed when the container P is supplied to the sealing device in a state in which a molded lid is not placed on a container body or not properly placed on the container body. When the lid detecting device 70 detects, in the intermediate stir wheel 40, a state in which a molded lid is not placed on a container body filled with liquid or not properly placed on the container body, as shown in FIG. 5, the cylinder rod 125 of the air cylinder corresponding to the container is controlled to retain a retracted state through the sealing operation of the sealing device. Specifically, when the rising and falling body 117 is caused to rise in the guiding cylinder via the cam follower 120 by the lower cam 121, the container table is also about to rise via the spring 119. However, since rising of the container table is regulated by the regulating member 127, the container body is prevented from coming into contact with the seal working surface of the horn. The container is not pressed against the horn via the lid.

As explained above, the lower cam 121(b) is continuously provided over the circumferential surface from the transfer position from the intermediate stir wheel 40 of the sealing device 100 to the sealing position to which the lower cam 121(b) rises and the transfer position to the carry-out stir wheel 81 that falls from the sealing position to which the lower cam 121(b) rises. The cam follower rolls on the upper surface of the lower cam while being guided by the lower cam and repeats a low horizontal circumferential movement, a rising circumferential movement, a high horizontal circumferential movement, a falling circumferential movement, and the low horizontal circumferential movement. However, the upper cam 121(a) is discontinuously provided near the transfer position from the intermediate stir wheel 40 of the sealing device and near the transfer position to the carry-out stir wheel 81 of the sealing device to reliably guide the transfer from the intermediate stir wheel 40 and the transfer to the carry-out stir wheel 81.

EXPLANATION OF LETTERS AND NUMERALS 20 container supplying device
21 container vertically adjusting device
22 conveyor
23 screw conveyor 24 inlet stir wheel
30 filling device
40 intermediate stir wheel
50 primary lid cold molding device
60 lid supplying device
70 lid detecting device
71 photoelectric sensor
72 laser sensor
73 bracket
80 container carrying-out device
81 carry-out stir wheel
82 carry-out conveyor
83 screw conveyor
90 secondary lid molding device
91 inlet stir wheel
92 outlet stir wheel
100 sealing device
101 ultrasonic welding machine
102 upper supporting plate
103 container table
104 lower supporting plate
105 driving shaft
106 control device
107 welding machine body
108 horn
109 guide
110 lower supporting plate
111 placing table
112 fixed plate
113 guiding cylinder
114 cylindrical bracket
115 container placing plate
116 container holder
117 rising and falling body
118 skirt
119 spring
120 cam follower
121 cam
121(*a*) upper cam
121(*b*) lower cam
122 lifting and lowering regulating rod
123 stopper
124 member to be regulated
125 cylinder rod
126 air cylinder
127 regulating member
P molded lid
A container
B container body

The invention claimed is:

1. A continuous rotary filling and packaging machine that fills a container body with liquid contents, covers the container body filled with the liquid contents with a lid, and seals the container body and the lid to produce a sealed container, the filling and packaging machine comprising:
a filling device that fills the container with the liquid contents while the container body rotationally moves;
a lid supplying device that supplies a molded lid to an upper end opening of the container body that is filled with the liquid contents and transferred from the filling device;
a lid detecting device to determine a container whose container body does not have the molded lid placed thereon or properly placed thereon, the lid detecting device being disposed on a downstream side of the lid supplying device; and
a sealing device including
a seal working surface for heat-sealing the molded lid to the upper end opening of the container body to produce the sealed container while the container body on which the molded lid is placed rotationally moves,
a cam mechanism for lifting and lowering a container table on which the container body is placed, the cam mechanism being configured such that the molded lid on the container body and the seal working surface come into press-contact with each other at a top dead point of the container table, and
a container table lowering control mechanism that does not lift a container table of a container whose container body does not have the molded lid placed thereon or properly placed thereon as determined by the lid detecting device, to the top dead point,
wherein the container table lowering control mechanism of the sealing device includes a fluid pressure cylinder for controlling the container table to be lowered against lifting of the container table by an urging force of the spring.

2. The continuous rotary filling and packaging machine according to claim 1, wherein the lid detecting device includes a pair of photoelectric sensors for detecting a conveyed container and a laser sensor for detecting the container whose container body does not have the molded lid placed thereon or properly placed thereon.

3. The continuous rotary filling and packaging machine according to claim 1, wherein the cam mechanism of the sealing device includes a spring for pushing up the container table, and the molded lid on the container body and the seal working surface are brought into press-contact with each other by an urging force of the spring during the sealing.

4. The continuous rotary filling and packaging machine according to claim 3, wherein the cam mechanism of the sealing device includes
a placing table fixed to a lower supporting plate and
a container table attached on an upper side of the placing table to be capable of rising and falling, the placing table includes a fixed plate fixed to the lower supporting plate,
a guiding cylinder provided at an upper side of the fixed plate, and
a cylindrical bracket provided to be suspended from the fixed plate, wherein the container table includes
a container placing plate on which the container is placed,
a container holder that is provided on an upper surface of the container placing table and positions the container on the container placing plate, and
a cylindrical skirt provided to be suspended from the container placing plate, and
wherein a rising and falling body that can slide to be capable of rising and falling in the guiding cylinder is provided in the guiding cylinder,
the cylindrical skirt of the container table is provided on the outer surface of the guiding cylinder of the placing table to be capable of sliding,
a spring that supports the container table from a lower side is provided between an upper end of the rising and falling body and a lower surface of the container placing table,
a long hole is provided in the guiding cylinder of the placing table,
a shaft is attached to a position of the rising and falling body corresponding to the long hole, a cam follower is provided at a distal end of the shaft, the cam follower is guided by a cam provided outward of the lower supporting plate of the sealing device, and the rising and falling body in the guiding cylinder rises and falls according to an operation of the cam follower.

5. The continuous rotary filling and packaging machine according to claim 1, wherein the container table lowering control mechanism of the sealing device is attached to be suspended from a center of a lower surface of the container placing plate and includes a member to be regulated provided at a lower end of a lifting and lowering regulating rod extending to pierce through a center of the rising and falling body to be capable of sliding against the rising and falling body, a fluid pressure cylinder attached to the cylindrical bracket of the placing table such that a cylinder rod faces up, and a regulating member provided at a distal end of the cylinder rod, and the container table lowering control mechanism performs control to retain a state in which the cylinder rod retracts, whereby rising of the container table is regulated by the regulating member via the member to be regulated.

6. The continuous rotary filling and packaging machine according to claim 1, wherein the fluid pressure cylinder is an air cylinder.

7. The continuous rotary filling and packaging machine according to claim 1 or 2, wherein the sealing device includes an ultrasonic horn that causes to act an ultrasonic rotational vibration in a rotating direction, of which a central axis is in a pressurizing direction, for pressurizing the molded lid and the container body.

8. The continuous rotary filling and packaging machine according to claim 1 or 2, wherein the molded lid is made of synthetic resin including a disc-like lid body and a skirt provided to be suspended from a circumferential edge of the lid body.

* * * * *